United States Patent [19]

Neice et al.

[11] 4,142,351
[45] Mar. 6, 1979

[54] MOWER DISCHARGE BOOT

[75] Inventors: George G. Neice, Richmond, Va.; Joseph A. Brown, Clinton, N.C.

[73] Assignee: Vann Industries, Inc., Clinton, N.C.

[21] Appl. No.: 774,046

[22] Filed: Mar. 3, 1977

[51] Int. Cl.² .......................................... A01D 35/22
[52] U.S. Cl. .................................................... 56/202
[58] Field of Search ...................... 56/202, 13.3, 13.4, 56/16.6; 15/330

[56] References Cited

U.S. PATENT DOCUMENTS

| 3,143,842 | 8/1964 | Mattson et al. | 56/202 |
| 3,494,116 | 2/1970 | Lempke | 56/202 |
| 3,499,275 | 3/1970 | Lozen | 56/202 |
| 3,618,157 | 11/1971 | Bassin | 15/330 |
| 3,716,977 | 2/1973 | Jackson | 56/202 |
| 3,822,536 | 7/1974 | Leader | 56/202 |
| 3,934,392 | 1/1976 | Moery et al. | 56/202 |

*Primary Examiner*—Russell R. Kinsey
*Attorney, Agent, or Firm*—Mason, Fenwick & Lawrence

[57] ABSTRACT

A discharge boot is connected to the clipping discharge chute of a rider-type mower with a flexible conduit extending from the boot to the blower input of a yard-type vacuum cleaner towed behind the mower. The boot includes a hollow rigid housing with a flexible rubber-like wall which can be cut to conform to the contour of the clipping discharge chute so that the chute can be positioned within the boot and maintained in position by a bracket connecting boot and the chute.

15 Claims, 5 Drawing Figures

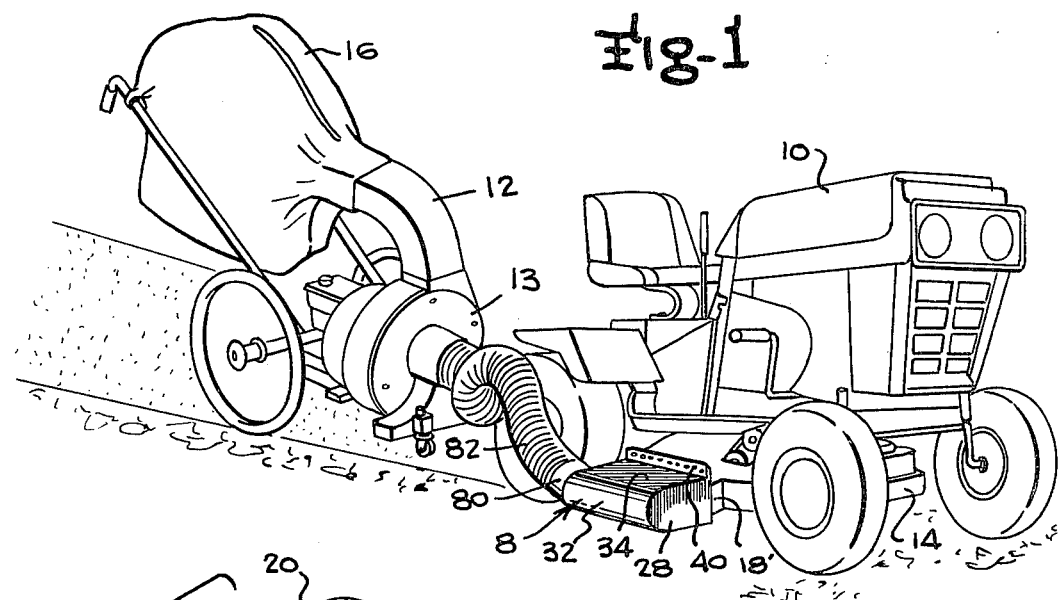
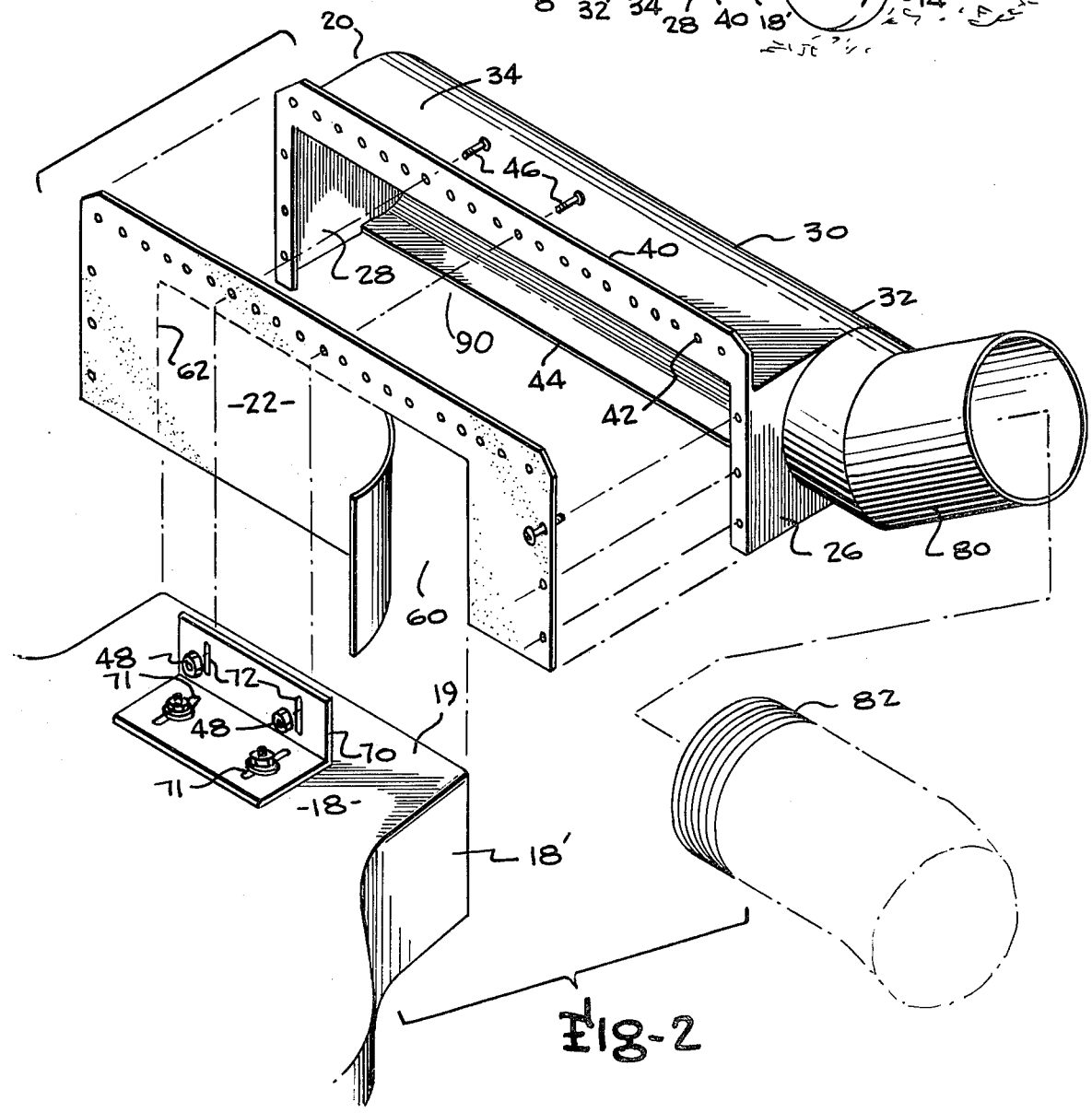

MOWER DISCHARGE BOOT

This invention is in the field of yard care and maintenance equipment and is specifically directed to means for permitting the connection of a yard-type vacuum cleaner to the discharge chute of a power operated rider mower or the like. More specifically, the present invention is directed in its preferred embodiment to a mower discharge boot connectable to the clipping discharge chute of a rider-type mower for receiving clippings and conveying same to the inlet of a power driven blower of an outdoor vacuum unit towed behind the mower. Even more specifically, the invention is directed to unique means for permitting the connection of the blower inlet of a vacuum unit to the clipping discharge chute of any one of a variety of power mowers having different sizes and shapes of clipping discharge chutes.

A wide variety of devices have been proposed for handling and receiving the clippings for power mowers. It is desirable that the amount of clippings falling to earth during a cutting operation should be reduced as much as possible for aesthetic purposes as well as for maintaining the health of the lawn surface to the fullest possible extent. To this end, a wide variety of bags, baskets, boxes and the like have been proposed for receiving the clippings with such devices relying upon the natural outflow of air from the cutting blade housing for effecting the conveyance of the clippings into the recipient bag or basket. The use of devices of the foregoing type has not proven to be entirely satisfactory in many instances due to the insufficient air flow for delivering the clippings from the housing. Moreover, such devices frequently reduce the amount of air flowing beneath the mower and up through the grass being cut, which air flow tends to aid in the cutting operation; consequently, such reduced air flow has a deleterious effect upon the cutting operation.

It is consequently, a primary object of this invention to provide a new and improved means for effecting the delivery of mower clippings to a receiving and storage means.

Obtainment of the foregoing object is enabled by the preferred embodiment of the invention through the provision of means for permitting the connection of a conventional gasoline driven outdoor type yard vacuum cleaner having a blower inlet connected to the clipping output discharge chute of a mower for always providing an effective flow of air through the cutting chamber housing of the mower to the clipping storage means. One problem in achieving the foregoing purpose arises from the fact that the clipping discharge chutes of different mowers are of different sizes and shapes so that the normal type of conduit suitable for connection to the discharge chute of one type of mower will not fit the discharge chute of another mower. Consequently, a further object of this invention is the provision of a new and improved connector for enabling the connection of the inlet of an outdoor type yard vacuum cleaner to the discharge chute of any one of a variety of conventional mowers in which the discharge chutes of the different mowers are of different shapes and dimensions.

Achievement of the foregoing objects is enabled by the preferred embodiment of the invention which consists of a mower discharge boot coupling comprising a rigid metal housing consisting of first and second spaced end walls connected by an elongated curved shroud consisting of a horizontally extending top plate and an arcuate side component. A hollow tubular fitting is provided in one of the end walls for connection to a flexible conduit extending rearwardly from the coupling for connection to the blower inlet of a power driven yard type vacuum cleaner towed behind a rider type mower having a clipping discharge chute to which the coupling is connected. The rigid portion of the housing is provided with an inverted U-shaped flange having a plurality of apertures spaced along its length for receiving connector bolts permitting attachment of a planar receptor wall formed of rubber-like material capable of having a portion removed to permit the insertion of the end of the clipping discharge chute of the mower through the receptor wall. An opening is provided in the lower portion of the housing for permitting the inflow of conveying air during operation of the blower of the vacuum cleaner. A bracket connectable to the clipping discharge chute of the mower is provided with apertures alignable with apertures extending through the receptor wall and the mounting flange of the housing for permitting a firm connection of the housing and other coupling components to the discharge chute.

A better understanding of the manner in which the preferred embodiments of the invention achieves the foregoing objects of the invention will be enabled when the following written description is considered in conjunction with the appended drawings in which:

FIG. 1 is a perspective view of the preferred embodiment of the invention comprising a boot type coupling mounted on and between a rider type mower and a conventional yard-type outdoor vacuum cleaner;

FIG. 2 is an exploded perspective view of the discharge boot coupling as associated with the clipping discharge chute of a mower;

Figure 3:
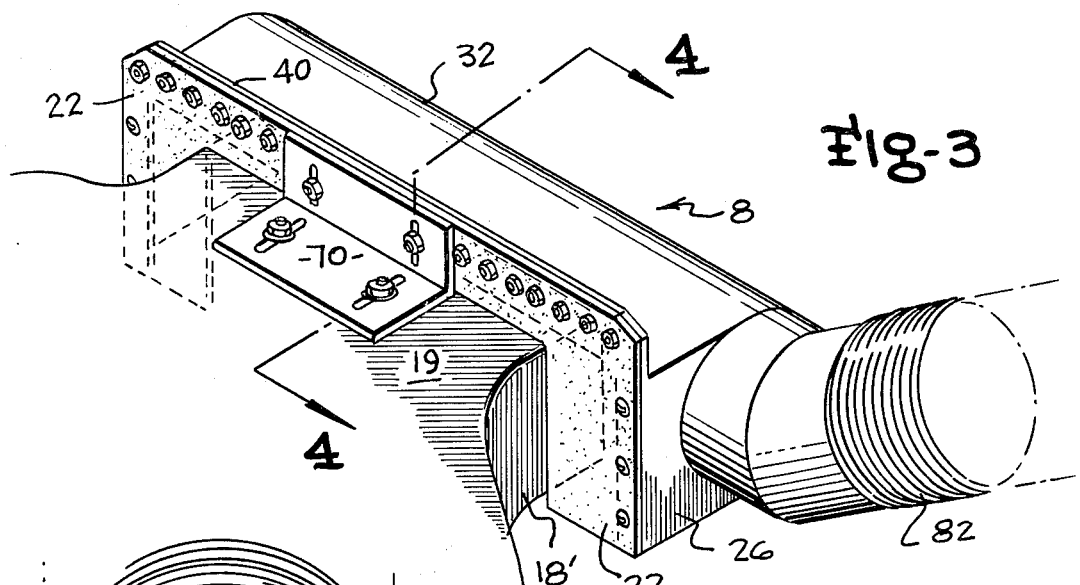
FIG. 3 is an assembled perspective view of the discharge boot coupling as attached to the clipping discharge chute of a mower.

Attention is initially invited to FIG. 1 of the drawings which illustrates the preferred embodiment of the invention consisting of a boot coupling generally designated 8 providing a connection between a rider-type mower 10 and a yard-type outdoor gasoline driven vacuum cleaner means 12 for conveying cuttings from the blade housing 14 of the mower 10 to the storage bag 16 of the vacuum cleaner. Blade housing 14 of the mower 10 has a transversely outwardly extending clipping discharge chute 18 from which the clippings and other debris are normally discharged. It should be understood that the term "clippings" as used throughout this application is not limited to grass cuttings and includes the other types of debris such as twigs, leaves and the like frequently encountered by such mowers.

Figure 4:
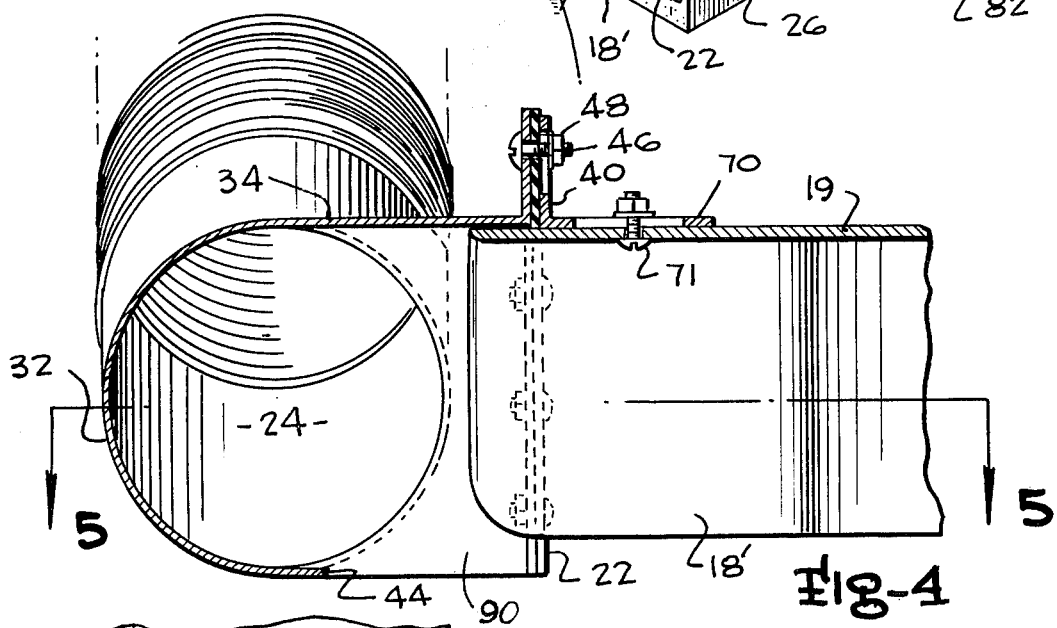
FIG. 4 is a sectional view taken along lines 4—4 of FIG. 3.
Figure 5:
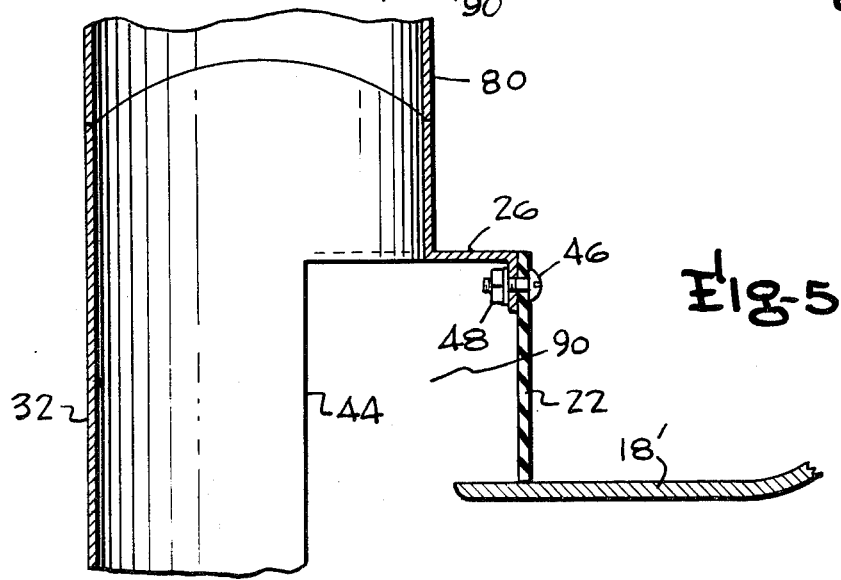
FIG. 5 is a sectional view taken along lines 5—5 of FIG. 4.

Clippings discharged from the clipping discharge chute 18 are directed into a discharge boot coupling member consisting of a rigid housing 20 and a flexible receptor wall 22 which together define a chamber 24 into which the clippings are directed. Rigid housing 20 is formed of metal or high strength plastic components and includes a first end wall 26 and a second end wall 28 with the end walls being parallel to each other and being connected by an elongated lengthwise extending shroud 30 consisting of an arcuate side wall portion 32 and a planar flat top wall 34 best illustrated in FIG. 4.

Rigid housing 20 includes an attachment flange 40 having a plurality of attachment apertures 42. Flange 40 is positioned in a plane coextensive with one edge of the end walls 26, 28 and the edge of the flat top wall 34 of the shroud member 30 as best shown in FIG. 2. Additionally, a lower edge 44 consisting of the lower termination of the arcuate portion 32 of the shroud member is provided in a position spaced from the flange portion 40. The flexible receptor wall 22 is connected to the flange 40 by a plurality of bolt members 46 and associated nuts 48 extending through apertures in the flexible wall section and the attachment apertures 42. The clipping discharge chute 18 has vertical side walls 18' and a top 19 which extends through opening 60 in the flexible receptor wall 22 provided by cutting the wall section 22 along a line 62 conforming to the outer outline of the side walls 18' and top 19 of chute 18. It should be understood that the flexible receptor wall 22 is formed of rubber-like material such as synthetic rubber or plastic which can be easily manually cut for effecting the provision of opening 60 for receiving the end of the chute 18.

A bracket member 70 is attached to the upper surface of the chute 18 by nut and bolt assemblies 71 and includes mounting apertures 72 through which two of the bolt members 46 extend for permitting attachment of the boot coupline 8 to the discharge chute 18 in the manner best illustrated in FIGS. 2 and 3.

Grass clippings discharged from the clipping discharge chute 18 are received in the outfeed chamber 24 and are then conveyed through a rigid tubular discharge fitting 80 provided in the first end wall 26. A flexible conduit 82 has a first end connected to the fitting 80 and has its second or discharge end connected to the lower inlet of the blower 13 of the vacuum cleaner 12 for conveying clippings from the mower to the cleaner for deposit in the storage bag 16 of the vacuum cleaner 12.

It will be observed that the clipping discharge chute 18 normally extends into the rigid housing 20; however, a conveying air inflow opening 90 is provided along opposite side edges 18' of the discharge chute in the lower portion of the boot member and in the space between edge 44 and the discharge chute 18. Consequently, operation of the blower 13 induces air flow upwardly through the opening 90 which is aided by the air flow from the housing 14 to provide a substantial quantity of air flowing through the boot member then into the tubular discharge fitting 80 and conduit 82 for subsequent optimum conveyance of the clippings into the bag member 16 in an obvious manner.

Not only does operation of the vacuum means 12 serve to remove substantially all of the clippings, it also enhances the operation of the mower member per se by reducing the likelihood of clogging in the blade housing 14 and by creating an additional air flow upwardly into the blade housing to a certain extent which aids in the cutting operation per se. Moreover, it will be appreciated that the subject invention can be used with practically any type of rider mower due to the fact that the flexible wall 22 can be cut to conform to the shape of any discharge chute.

While many modifications of the subject invention will undoubtedly occur to those of skill in the art, it should be understood that the spirit and scope of the invention is to be limited solely by the appended claims.

We claim:

1. A mower discharge boot coupling for enabling the connection of a clipping receiving means to a selected one of a plurality of power mower discharge chutes each being of differing dimensions, said coupling comprising a housing defining an outfeed chamber, said housing including a receptor wall formed of relatively flexible material capable of being manually cut along desired portions to define an opening in which the discharge chute of a selected mower can be received to effect discharge of clippings into said outfeed chamber upon operation of said selected mower and outfeed conduit means having an upstream end communicating with said outfeed chamber and having an opposite discharge end communicating with said clipping receiving means so as to permit delivery of clippings to said clipping receiving means.

2. The invention of claim 1 wherein said housing comprises a rigid portion including first and second parallel end walls and a lengthwise extending shroud extending between said first and second end walls and cooperating therewith to partially define siad outfeed chamber.

3. The invention of claim 1 wherein said housing comprises a rigid portion including first and second parallel end walls and a lengthwise extending shroud, said first and second parallel end walls and said lengthwise extending shroud having edge portions positioned in a common plane and fastening means connecting said receptor wall to said edge portions.

4. The invention of claim 1 wherein said receptor wall is formed of flexible rubber-like material and said housing comprises a rigid portion including first and second parallel end walls connected by a lengthwise extending shroud, said first and second end walls and said lengthwise extending shroud having coplanar edge portions and fastening means connecting said receptor wall to said coplaner edge portions.

5. The invention of claim 4 wherein said coplanar edge portions include flange elements each having a plurality of attachment apertures and said fastening means includes bolt means extending through at least one of said apertures and an aligned aperture in said receptor wall.

6. The invention of claim 4 additionally including bracket means mountable on said discharge chute, mounting apertures in said bracket means and wherein said coplanar edge portions include flange elements each of which includes a plurality of attachment apertures and said fastening means includes bolt means extending through at least one of said attachment apertures, one of said mounting apertures and an aligned aperture in said receptor wall.

7. The invention of claim 1 wherein said clipping receiving means includes a power driven vacuum creating blower having an inlet and an outlet discharging into a container, said discharge end of said outfeed conduit being connected to the inlet of said blower.

8. The invention of claim 7 additionally including a conveying air inlet in said housing permitting the inflow of ambient air into said outfeed chamber for conveying clippings therefrom into said outfeed conduit.

9. The invention of claim 1 wherein said clipping receiving means comprises an outdoor type vacuum cleaner having a blower inlet and a blower outlet discharging into a container, said discharge end of said outfeed conduit being connected to the blower inlet and additionally including a conveying air inlet provided in the bottom portion of said housing permitting the inflow of ambient air into said outfeed chamber for conveying clippings therefrom into said outfeed conduit.

10. The invention of claim 9 wherein said housing comprises a rigid portion including first and second parallel end walls and a lengthwise extending shroud extending between said first and second end walls and cooperating therewith to partially define said outfeed chamber.

11. The invention of claim 10 additionally including a rigid tubular fitting extending outwardly of one of said end walls and having a hollow interior passageway communicating with said outfeed chamber, and wherein said outfeed conduit upstream end is connected to said tubular fitting.

12. The invention of claim 9 wherein said receptor wall is formed of flexible rubber-like material and said housing comprises a rigid portion including first and second parallel end walls connected by a lengthwise extending shroud, said first and second end walls and said lengthwise extending shroud having a coplaner edge portions and fastening means connecting said receptor wall to said coplanar edge portions.

13. The invention of claim 12 wherein said coplanar edge portions include flange elements each having a plurality of attachment apertures and said fastening means includes bolt means extending through at least one of said apertures and an aligned aperture in said receptor wall.

14. The invention of claim 1 wherein said clipping receiving means comprises an outdoor type vacuum cleaner having a blower inlet and a blower outlet discharging into a bag-like container, said discharge end of said outfeed conduit being connected to said blower inlet and additionally including a conveying air inlet provided in the bottom of said housing permitting the inflow of ambient air into said outfeed chamber for conveying clippings therefrom into said outfeed conduit, said longitudinally extending shroud comprising an arcuate side wall portion having a lower side edge spaced from said receptor wall, said conveying air inlet being positioned between said receptor wall and said lower edge of said arcuate side wall component.

15. The invention of claim 7 additionally including a rigid tubular fitting extending outwardly of one of said end walls and having a hollow interior communicating with said outfeed chamber, said outfeed conduit upstream end being connected to said tubular fitting.

* * * * *